(12) United States Patent
Griffin

(10) Patent No.: US 6,556,212 B1
(45) Date of Patent: Apr. 29, 2003

(54) METHOD AND APPARATUS FOR DISPLAYING A CHAIN OF ROTATING COLOR OUTPUT UNITS ON A DISPLAYER OF A DATA PROCESSING SYSTEM

(76) Inventor: Joseph W. Griffin, 717 Hitchcock Ave., Lisle, IL (US) 60532

( * ) Notice: Subject to any disclaimer, the term of this patent is extended or adjusted under 35 U.S.C. 154(b) by 246 days.

(21) Appl. No.: 09/638,971

(22) Filed: Aug. 15, 2000

Related U.S. Application Data

(63) Continuation-in-part of application No. 09/440,541, filed on Nov. 15, 1999.

(51) Int. Cl.$^7$ ................................................ G09G 5/02
(52) U.S. Cl. ..................................................... 345/593
(58) Field of Search ................................. 345/593, 594

(56) References Cited

U.S. PATENT DOCUMENTS

| | | | | |
|---|---|---|---|---|
| 3,911,418 A | * | 10/1975 | Takeda | 345/22 |
| 4,908,779 A | * | 3/1990 | Iwata | 345/550 |
| RE33,894 E | * | 4/1992 | Bradley | 345/551 |
| 5,249,263 A | * | 9/1993 | Yanker | 345/594 |
| RE34,835 E | * | 1/1995 | Ozeki | 345/593 |
| 5,615,320 A | * | 3/1997 | Lavendel | 345/593 |
| 5,872,555 A | | 2/1999 | Kolar et al. | |
| 6,021,417 A | | 2/2000 | Massarksy | |
| 6,226,010 B1 | * | 5/2001 | Long | 345/594 |

* cited by examiner

Primary Examiner—Jeffery Brier
Assistant Examiner—Ryan Yang
(74) Attorney, Agent, or Firm—Charles F. Meroni, Jr.; Meroni & Meroni, P.C.

(57) ABSTRACT

This invention concerns a method for displaying a chain of rotating color output units in different colors according to a color sequence on a displayer of a data processing system that comprises generating a request to start a process for displaying the chain of rotating color output units in different colors according to the color sequence on the displayer, selecting a background color for the displayer, creating a color sequence, making the background color unavailable to the color sequence, getting an input unit from an inputting device, getting a color from the color sequence, and displaying the input unit as an output unit in the color got from the color sequence on the displayer of the data processing system. The method further comprises repeating the step of getting an input unit from an inputting device, the step of getting a color from the color sequence, and the step of displaying the input unit as an output unit in the color got from the color sequence on the displayer of the data processing system for each input unit until all the input units have been inputted and displayed as a chain of rotating color output units in different colors according to the color sequence on the displayer. The present invention also concerns an apparatus and a computer program product for displaying a chain of rotating color output units in different colors according to a color sequence on a displayer of a data processing system.

27 Claims, 10 Drawing Sheets

METHOD AND APPARATUS FOR DISPLAYING A CHAIN OF ROTATING COLOR OUTPUT UNITS ON A DISPLAYER OF A DATA PROCESSING SYSTEM

CROSS-REFERENCE TO RELATED APPLICATION

This application is a continuation-in-part of prior application Ser. No. 09/440,541, filed Nov. 15, 1999.

BACKGROUND OF THE INVENTION

1. Field of the Invention

The present invention relates to data processing systems. More specifically, my invention is primarily relates to a method, an apparatus, and a computer program product for displaying a chain of rotating color output units on a displayer of a data processing system.

2. Description of the Prior Art

Color graphical user interfaces, including color text displaying, are becoming increasingly common in the workplace and home today. Most of the computer software, including various operating systems, word processing applications, and other user-friendly software application, has employed color graphical user interfaces. Color text displaying is widely used in such areas, where the color text can provide more attraction to the viewer than the regular black text.

Color graphical user interfaces and color text displaying are well known in the art. U.S. Pat. No. 5,872,555 discloses a method and apparatus for editing the custom colors from a Quick Color Selector on a personal computer desktop. An Edit Custom Colors button is provided on the Quick Color Selector. Activating this button causes a Color Editor to appear, either as a separate window or as an expansion of the Quick Color Selector. This invention also provides for a user to specify which custom color chip is to be edited (the target chip). In particular, navigation controls are provided to enable the user to move an identifying cursor across an array of custom color chips. The navigation controls may appear in the Quick Color Selector or in the Color Editor. The Quick Color Selector still exhibits its expected transient behavior in that it, together with any separate Color Editor window, disappears immediately after the user selects a color chip. Navigation controls are also applicable to the Persistent Color Selector, where they provide for consistency with the Quick Color Selector, and allow the user to specify the target color chip independently of the currently selected color chip. In order to practice this invention, a user must first highlight a target area, second specify or customize a color, and third display the target area in the color. This invention enables a user to specify and customize the color of a highlighted area, but not a highlighted text, on a displayer of a data processing system.

U.S. Pat. No. 6,021,417 discloses a method and an apparatus of stimulating the creation of an artist's drawing or painting. This invention features in one embodiment a method of simulating the creation of a mock artist's drawing or painting image on a monitor, from an electronically-stored image, comprising translating the electronically-stored image into instructions capable of creating the mock image; generating and displaying on the monitor an icon which simulates drawing or painting the mock image; and using the instructions to move the icon across the monitor, wherein the mock image is created gradually as the icon moves across the monitor, to simulate the process by which an artist may create the mock image. In another embodiment, this invention features a method of simulating the creation of a mock artist's drawing or painting image on a monitor, from an electronically-stored image, comprising: electronically storing a plurality of display textures for use in creating the mock image; translating the electronically-stored image into instructions capable of creating the mock image, including determining a display-parameter value of pixels of the electronically-stored image, and dividing the determined values into groups, in which the groups represent continuous portions of a display parameter spectrum; and in which the translating step further includes substituting the stored display textures for portions of the electronically-stored image; generating and displaying on the monitor an icon which simulates drawing or painting the mock image; and using the instructions to move the icon across the monitor, wherein the mock image is created gradually as the icon moves across the monitor, to simulate the process by which an artist may create the mock image. In yet another embodiment, this invention features a method of simulating the creation of a mock artist's drawing or painting image on a monitor, from an electronically-stored image, comprising: electronically storing a plurality of display textures for use in creating the mock image, including determining the gray scale value of pixels of the electronically-stored image, dividing the determined gray scale values into groups, and in which the translating step includes substituting the stored display textures for portions of the electronically-stored image; generating and displaying on the monitor an icon which simulates drawing or painting the mock image; and using the instructions to move the icon across the monitor, wherein the mock image is created gradually as the icon moves across the monitor, to simulate the process by which an artist may create the mock image, including displaying on the monitor the substituted display textures in the areas of the display corresponding to the substituted portions of the electronically-stored image, and in which displaying on the monitor the substituted display textures includes gradually creating on the monitor the substituted display textures, and in which gradually creating the substituted display textures includes moving the icon across the monitor in a predetermined movement pattern, in which the predetermined movement pattern is accomplished in one area of the display corresponding to the substituted portions of the electronically-stored image at a time, and further in which gradually creating on the monitor the substituted display textures includes creating the display textures along the path on which the icon traverses the monitor, as the icon traverses the monitor. This invention is capable of present different images in different colors on a displayer of a data processing system. However, this invention is not capable of displaying a chain of rotating color text in different colors on a displayer of a data processing system.

What is needed then is a method, an apparatus, and a computer program product for displaying a chain of rotating color output units on a displayer of a data processing system.

Accordingly, it is a principal objective of my invention to provide a method, an apparatus, and a computer program product that is capable of displaying rotating color output units, such as a chain of rotating color output units, on a displayer of a data processing system.

It is a further objective of my invention to provide a method, an apparatus, and a computer program product that is capable of displaying rotating color output units, such as a chain of rotating color output units, on a displayer of a data processing system in an efficient way.

It is a still further objective of my invention to provide a method, an apparatus, and a computer program product that is capable of displaying rotating color output units, such as a chain of rotating color output units, in randomly selected colors from all available colors on a displayer of a data processing system in an efficient way.

It is a still further object of my invention to provide a method, an apparatus, and a computer program product that is capable of displaying rotating color output units, such as a chain of rotating color output units, in randomly selected colors from a pre-determined color sequence on a displayer of a data processing system in an efficient way.

It is a still further object of my invention to provide a method, an apparatus, and a computer program product that is capable of displaying rotating color output units, such as a chain of rotating color output units, in sequentially selected colors from a pre-determined color sequence on a displayer of a data processing system in an efficient way.

Other objects of my invention, as well as particular features, elements, and advantages thereof, will be elucidated in, or apparent from, the following description and the accompanying drawing figures.

SUMMARY OF THE INVENTION

According to my present invention I have provided a method, an apparatus, and a computer program product for displaying a chain of rotating color output units on a displayer of a data processing system. The data processing system can be a regular data processing system, a digital data processing system, or like. The present invention provides a method for displaying a chain of input units as a chain of rotating color output units in different colors according to a color sequence on a displayer of a data processing system that comprises generating a request to start a process for displaying the chain of input units as the chain of rotating color output units in different colors according to the color sequence on the displayer, selecting a background color for the displayer, creating a color sequence, making the background color unavailable to the color sequence, getting an input unit from an inputting device, getting a color from the color sequence, and displaying the input unit as an output unit in the color got from the color sequence on the displayer of the data processing system. The method further comprises repeating the step of getting an input unit from an inputting device, the step of getting a color from the color sequence, and the step of displaying the input unit as an output unit in the color got from the color sequence on the displayer of the data processing system for each input unit until all the input units have been inputted and displayed as a chain of rotating color output units in different colors according to the color sequence on the displayer of the data processing system.

The present invention also provides an apparatus for displaying a chain of input units as a chain of rotating color output units in different colors according to a color sequence on a displayer of a data processing system that comprises a means for generating a request to start a process for displaying the chain of input units as the chain of rotating color output units in different colors according to the color sequence on the displayer, a means for selecting a background color for the displayer, a means for creating a color sequence, a means for making the background color unavailable to the color sequence, a means for getting an input unit from an inputting device, a means for getting a color from the color sequence, and a means for displaying the input unit as an output unit in the color got from the color sequence on the displayer of the data processing system. The apparatus further comprises a means for repeating the step of getting an input unit from an inputting device, the step of getting a color from the color sequence, and the step of displaying the input unit as an output unit in the color got from the color sequence on the displayer of the data processing system for each input unit until all the input units have been inputted and displayed as a chain of rotating color output units in different colors according to the color sequence on the displayer of the data processing system.

The present invention further provides a computer program product having a computer readable medium having computer program logic recorded thereon for a method for displaying a chain of input units as a chain of rotating color output units in different colors according to a color sequence on a displayer of a data processing system that comprises a computer readable means for generating a request to start a process for displaying the chain of input units as the chain of rotating color output units in different colors according to the color sequence on the displayer, a computer readable means for selecting a background color for the displayer, a computer readable means for creating a color sequence, a computer readable means for making the background color unavailable to the color sequence, a computer readable means for getting an input unit from an inputting device, a computer readable means for getting a color from the color sequence, and a computer readable means for displaying the input unit as an output unit in the color got from the color sequence on the displayer of the data processing system.

The input unit can be a character, a word, a symbol, or any definable unit. The input unit can be defined by either a user, or the data processing system. The output unit has the same definition as the input unit. The inputting devices include keyboard, mouse, voice recognition devices, computer readable medium, and like. The color sequence can be created by either the data processing system, or a user. The displayer can be a screen of a color monitor of a data processing system, a printout of a color printer connected to the data processing system, or any kind of color displaying device of a data processing system.

DESCRIPTION OF THE DRAWINGS

Other features of my invention will become more evident from a consideration of the following detailed description of my patent drawings, as follows.

DETAILED DESCRIPTION OF THE PREFERRED EMBODIMENT

Figure 1:
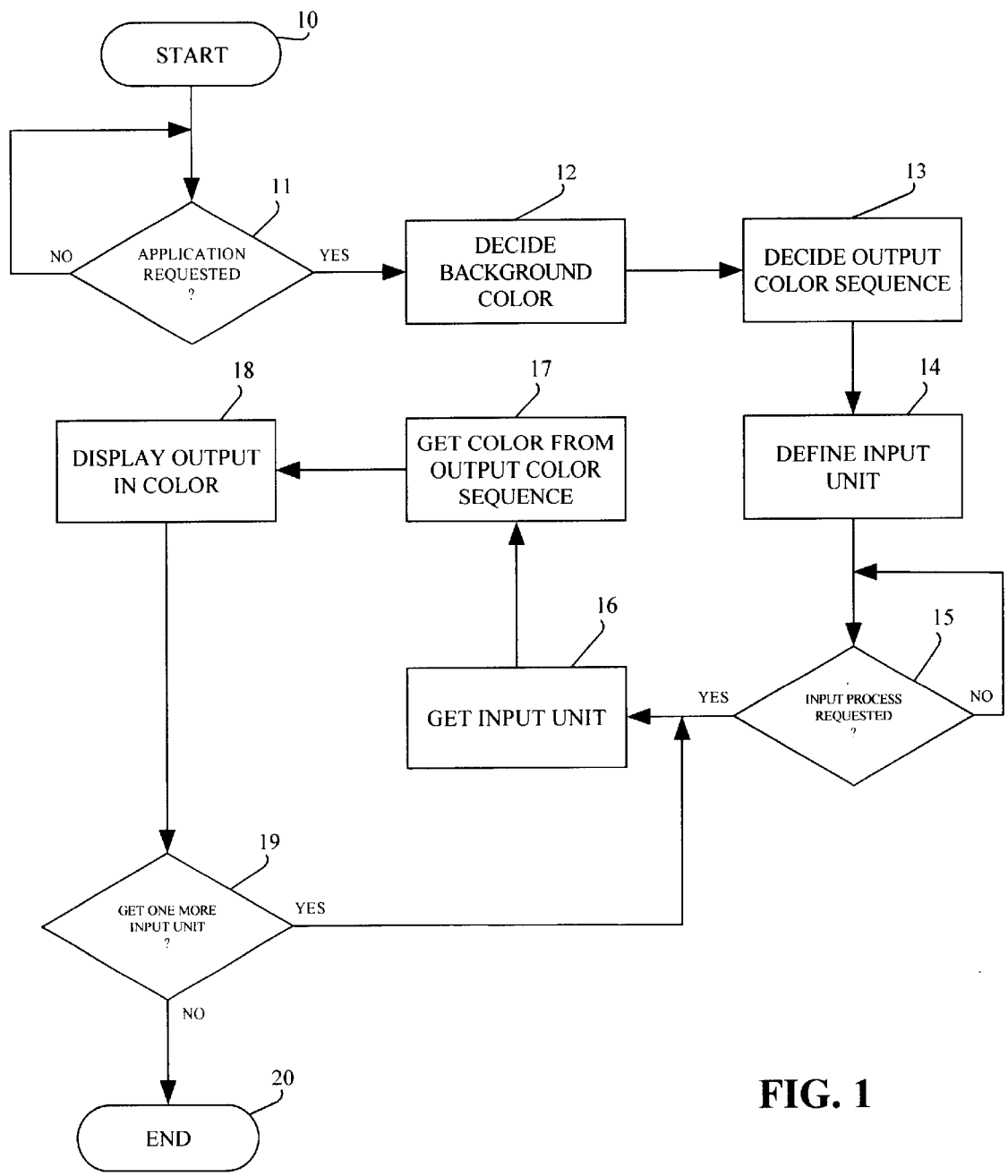
FIG. 1 is a flow diagram of major steps for displaying a chain of rotating color output units.

Referring now to the drawings, my invention concerns a method and apparatus for displaying a chain of rotating color output units on a displayer of a data processing system.

Referring now to FIG. 1, there is shown a brief flow diagram of one embodiment for my invention of a method and apparatus for displaying a chain of rotating color output units on a displayer of a data processing system. A procedure starts at block 10, and proceeds immediately to block 11, where a check is conducted to determine if an application request for displaying a chain of rotating color output units on a displayer of a data processing system has been detected. If NO, the procedure continues looping awaiting an application request for displaying a chain of rotating color output units on a displayer of a data processing system. If YES, the procedure proceeds to block 12. At block 12, the procedure decides a background color for the displayer, and proceeds immediately to block 13. At block 13, the procedure decides an output color sequence for displaying a chain of rotating color output units on the displayer, and proceeds immediately to block 14. At block 14, the procedure defines an input unit, and proceeds immediately to block 15, where a check is conducted to determine if an input process is requested. If NO, the procedure continues looping awaiting an input process request. If YES, the procedure procedures to block 16. At block 16, the procedure gets one input unit from an inputting device, and proceeds immediately to block 17. At block 17, the procedure gets a color from the output color sequence, and proceeds immediately to block 18. At block 18, the procedure displays the input unit as an output unit in the color got from the output color sequence, and proceeds immediately to block 19, where a check is conducted to determine if there is a need to get one more input unit. If YES, the procedure continues going back to block 16 to get one more input unit. If NO, the procedure proceeds immediately to block 20 and ends right there.

Figure 2:
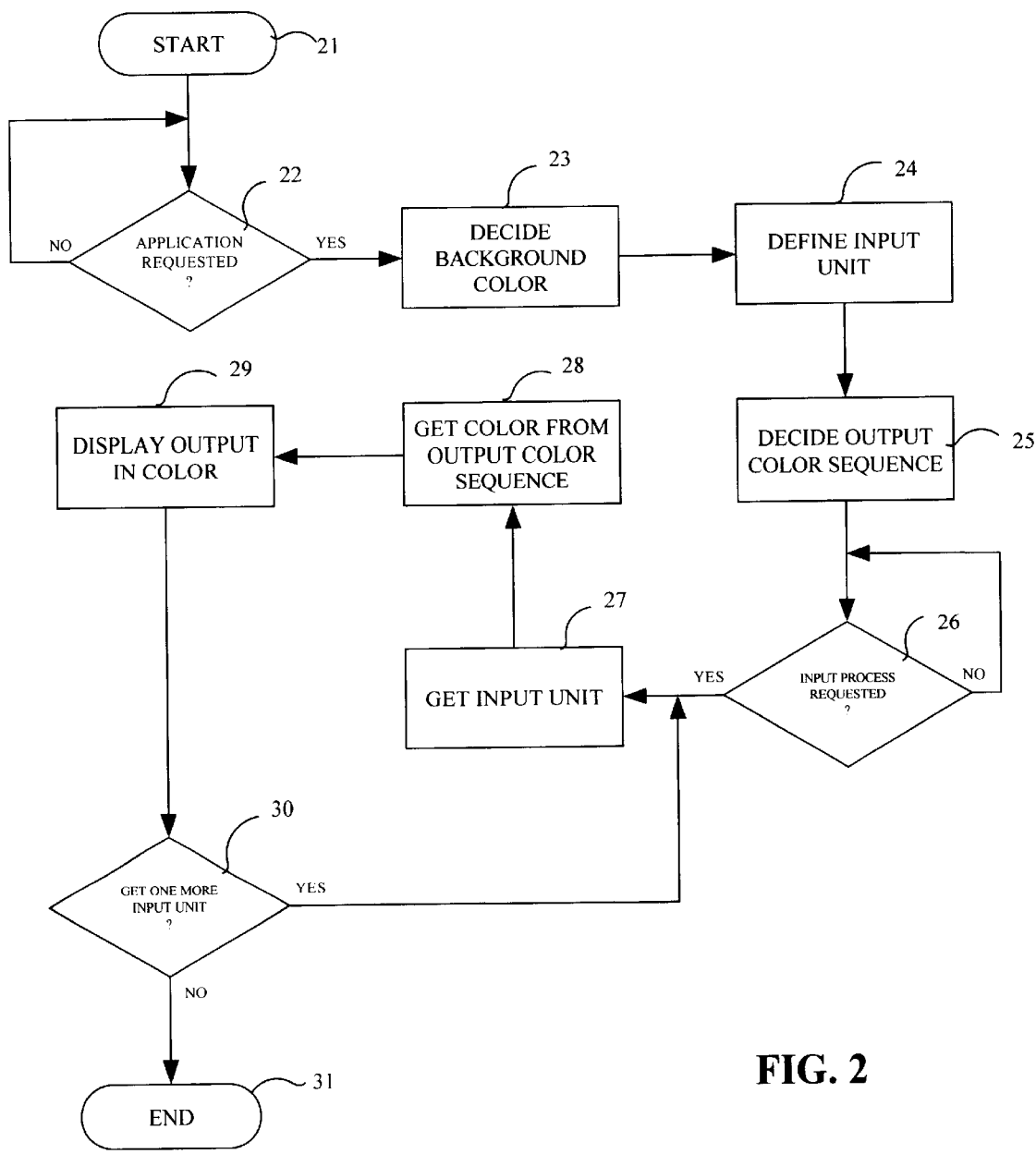
FIG. 2 is another flow diagram of major steps for displaying a chain of rotating color output units.
Figure 3:
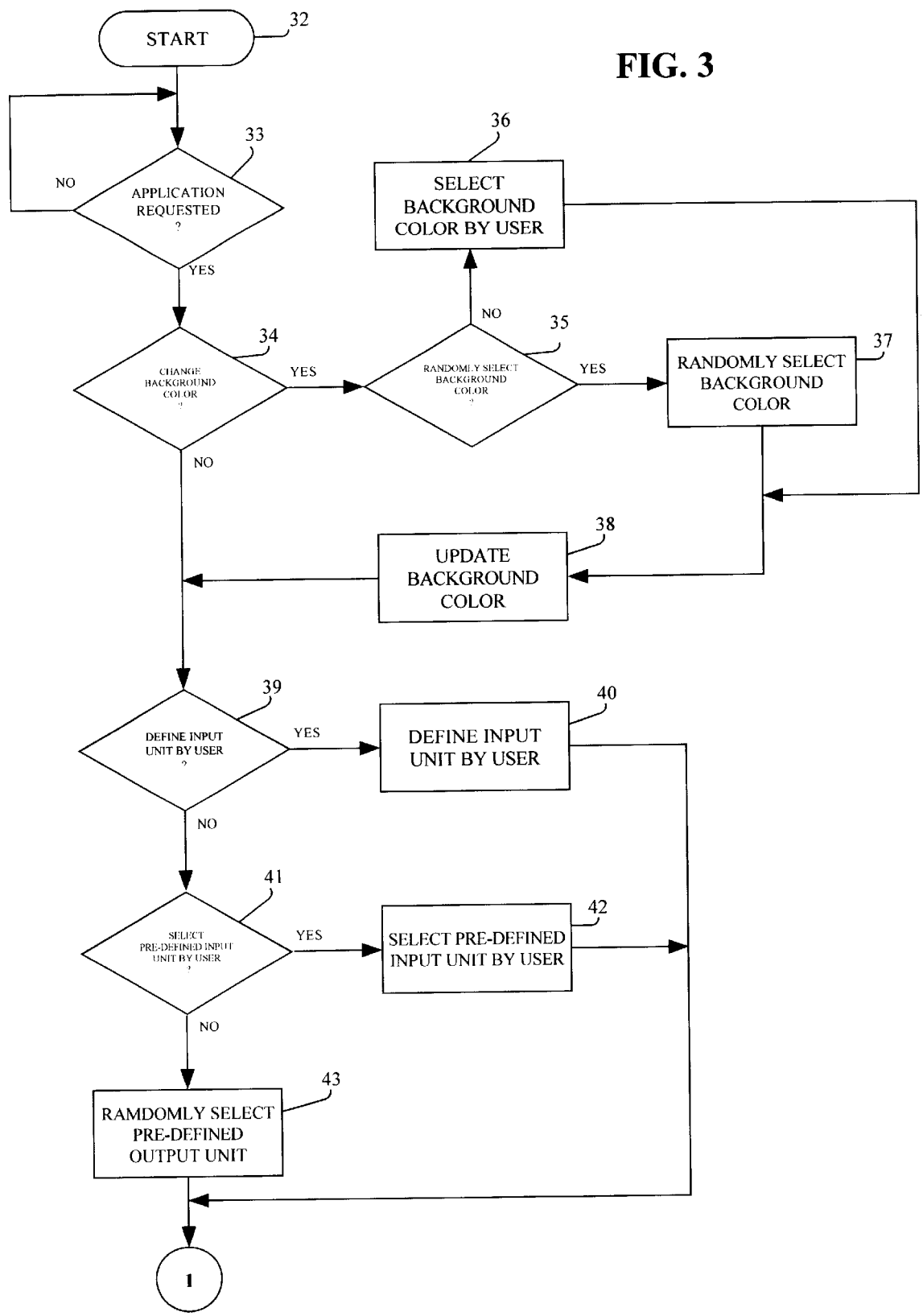
FIGS. 3–6 are flow diagrams of detail steps for displaying a chain of rotating color output units.

Referring now to FIG. 2, there is shown a brief flow diagram of another embodiment for my invention of a method and apparatus for displaying a chain of rotating color output units on a displayer of a data processing system. A procedure starts at block 21, and proceeds immediately to block 22, where a check is conducted to determine if an application request for displaying a chain of rotating color output units on a displayer of a data processing system has been detected. If NO, the procedure continues looping awaiting an application request for displaying a chain of rotating color output units on a displayer of a data processing system. If YES, the procedure proceeds to block 23. At block 23, the procedure decides a background color for the displayer, and proceeds immediately to block 24. At block 24, the procedure defines an input unit, and proceeds immediately to block 25. At block 25, the procedure decides an output color sequence for displaying a chain of rotating color output units on the displayer, and proceeds immediately to block 26, where a check is conducted to determine if an input process is requested. If NO, the procedure continues looping awaiting an input process request. If YES, the procedure proceeds to block 27. At block 27, the procedure gets one input unit from an inputting device, and proceeds immediately to block 28. At block 28, the procedure gets a color from the output color sequence, and proceeds immediately to block 29. At block 29, the procedure displays the input unit as an output unit in the color, and proceeds immediately to block 30, where a check is conducted to determine if there is a need to get one more input unit. If YES, the procedure continues going back to block 27 to get one more input unit. If NO, the procedure proceeds immediately to block 31 and ends right there. The only difference between the flow diagram in FIG. 1 and the flow diagram in FIG. 2 is that the step of defining input unit and the step of deciding output color sequence are reversed in these two flow diagrams.

Referring now to FIGS. 3–6, there is shown a detail flow diagram for my invention of a method and apparatus for displaying a chain of rotating color output units on a displayer of a data processing system, which is based on the brief flow diagram in FIG. 2.

Figure 4:
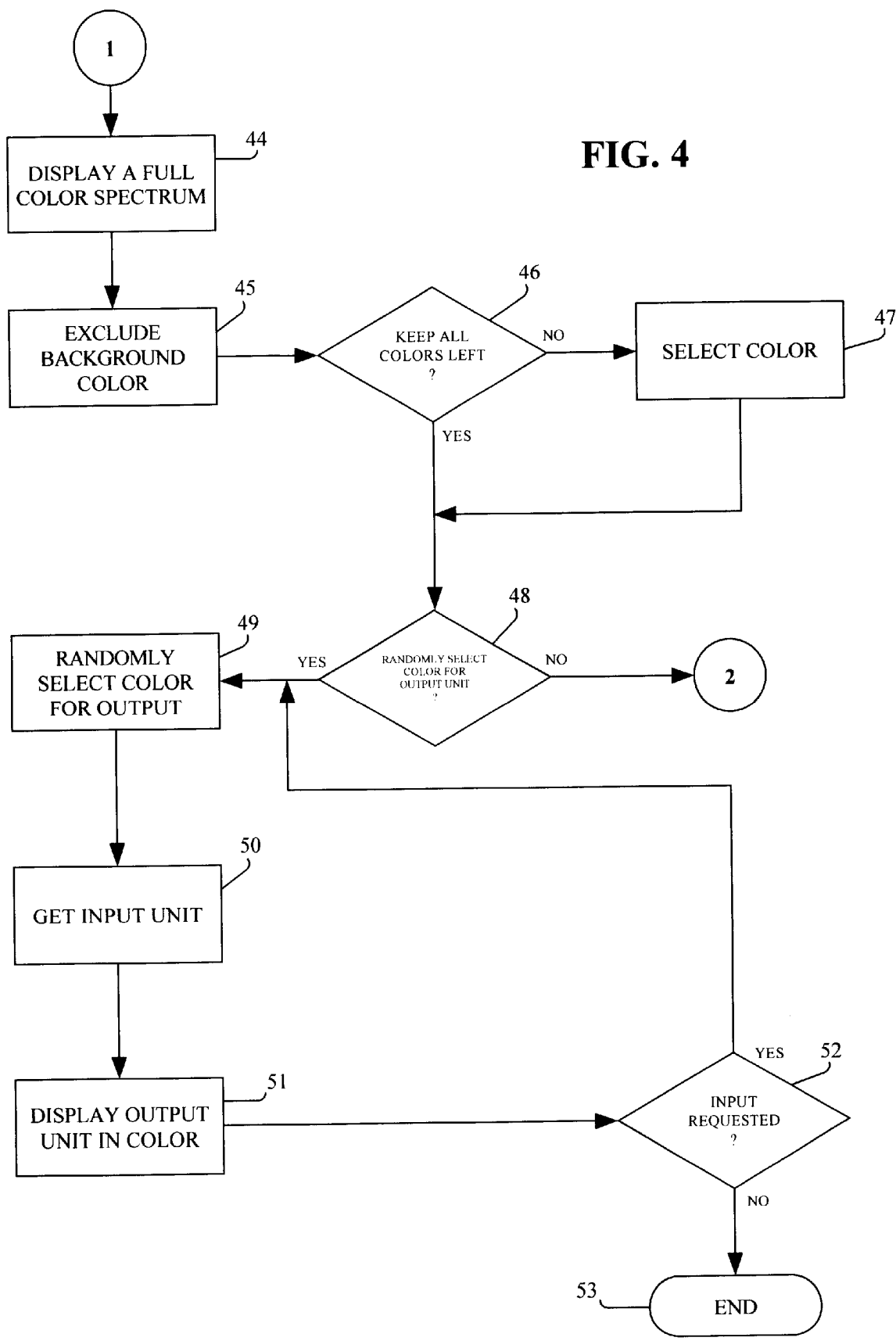
Figure 5:
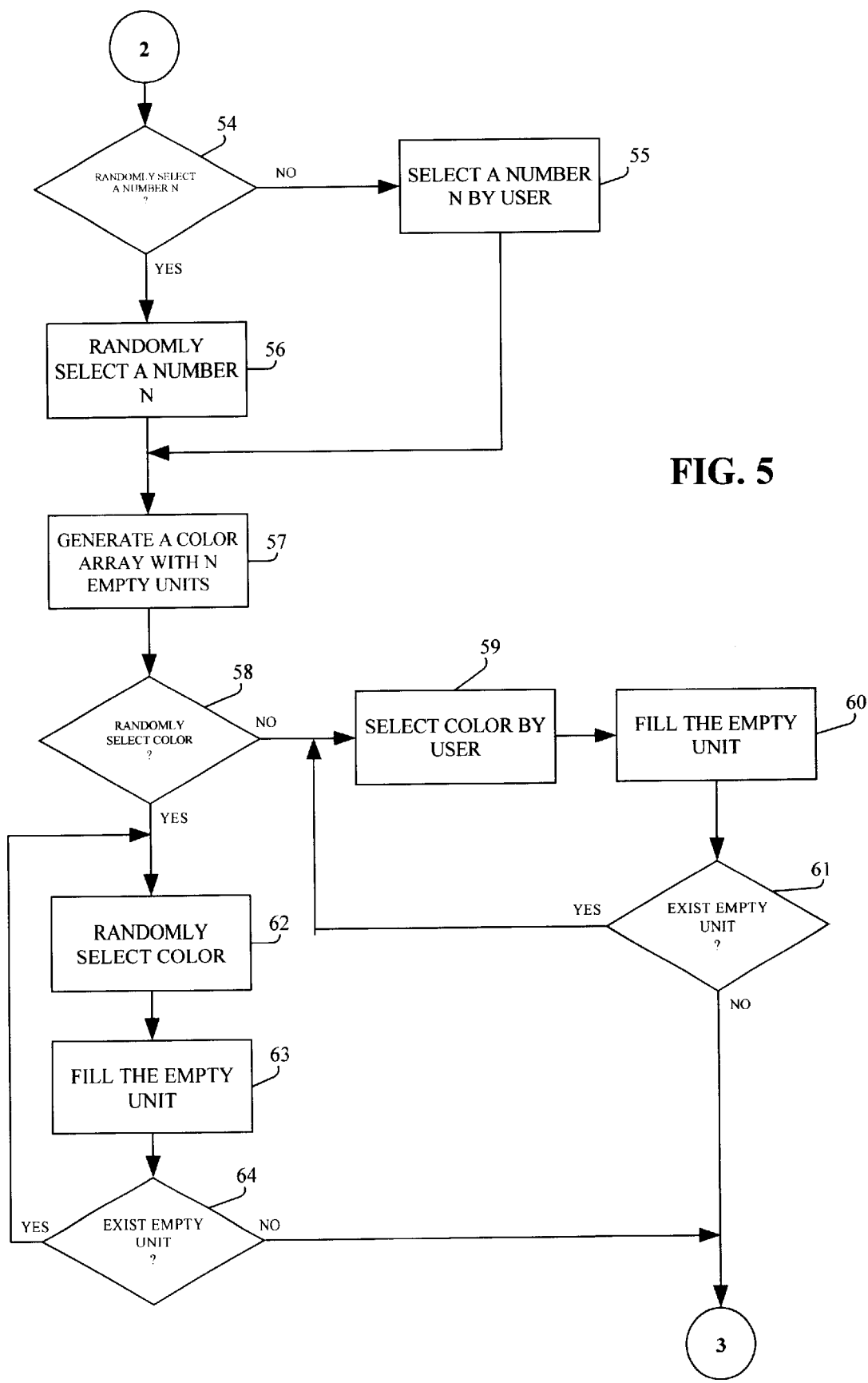
Figure 6:
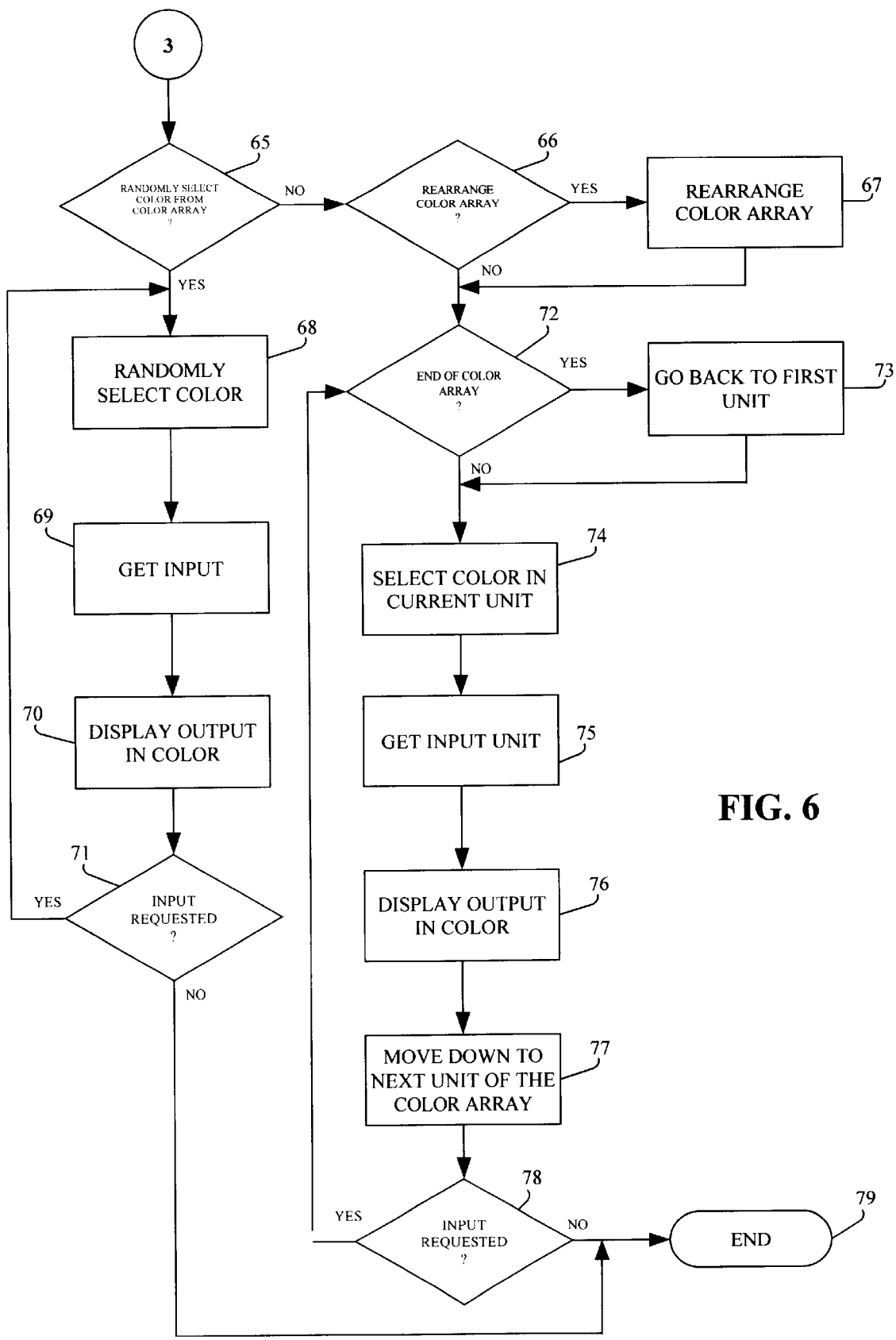

A procedure starts at block 32, and proceeds immediately to block 33, where a check is conducted to determine if an application request for displaying a chain of rotating color output units on a displayer of a data processing system has been detected. If NO, the procedure continues looping awaiting an application request for displaying a chain of rotating color output units on a displayer of a data processing system. If YES, the procedure proceeds immediately to block 34, where a check is conducted to determine if a request for changing background color is detected. If NO, the procedure proceeds immediately to block 39. Returning to block 34, if a request for changing background color is detected, the procedure proceeds immediately to block 35, where a check is conducted to determine if a request for randomly selecting background color is detected. If NO, the procedure proceeds immediately to block 36. At block 36, the procedure allows a user to select a background color through an inputting device, such as keyboard, mouse, voice recognition device, and like, and proceeds immediately to block 38. Returning to block 35, if a request for randomly selecting background color is detected, the procedure proceeds immediately to block 37. At block 37, the procedure allows the data processing system to randomly select a background color, and proceeds immediately to block 38. At block 38, the procedure allows the data processing system to update the background color to the selected background color, and proceeds to block 39. At block 39, a check is conducted to determine if a request for defining input unit by a user is detected. If YES, the procedure proceeds immediately to block 40. At block 40, the procedure allows a user to define input unit, and proceeds immediately to block 44 (FIG. 4). Returning to block 39, if a request for defining input unit by a user is not detected, the procedure proceeds immediately to block 41, where a check is conducted to determine if a request for selecting pre-defined input unit by a user. If YES, the procedure proceeds immediately to block 42. At block 42, the procedure allows a user to select a pre-defined input unit, and proceeds immediately to block 44 (FIG. 4). Returning to block 41, if a request for selecting pre-defined input unit by a user is not detected, the procedure proceeds immediately to block 43. At block 43, the procedure allows the data processing system to randomly select a pre-defined input unit, and proceeds immediately to block 44 (FIG. 4). At block 44, the procedure displays a full color spectrum on the displayer, and proceeds immediately to block 45. At block 45, the procedure excludes background color from the full color spectrum automatically, and proceeds immediately to block 46, where a check is conducted to determine if a request to keep all colors left is detected. If NO, the procedure proceeds immediately to block 47. At block 47, the procedure allows a user to select partial color spectrum, and proceeds immediately to block 48. Returning to block 46, if a request for keeping all colors left is detected, the procedure proceeds immediately to block 48. At block 48, a check is conducted to determine if a request for randomly selecting a color for an output unit is detected. If YES, the procedure proceeds immediately to block 49. At block 49, the procedure randomly selects a color for an output unit, and proceeds to block 50. At block 50, the procedure allows the data processing system to get one input unit from an inputting device, and proceeds immediately to block 51. At block 51, the procedure allows the data processing system to display the output unit in the randomly selected color on the displayer, and proceeds immediately to block 52, where a check is conducted to determine if a request for inputting an input unit has been detected. If No, the procedure proceeds immediately to block 53 and ends right there. Returning to block 52, if a request for inputting an input unit has not been detected, the procedure continues going back to block 49. Returning to block 48, if a request for randomly selecting a color for an output unit is not detected, the procedure proceeds immediately to block 54 (FIG. 5). At block 54, a check is conducted to determine if a request for randomly selecting a number N for defining number of units of a color array has been detected. If NO, the procedure allows a user to select a number N though an inputting device, such as keyboard, mouse, voice recognition device, and like, and proceeds immediately to block 57. Returning to block 54, if a request for randomly selecting a number N is detected, the procedure proceeds immediately to block 56. At block 56, the procedure allows the data processing system to randomly select a number N to define number of units of a blank array, and proceeds immediately to block 57. At block 57, the procedure allows the data processing system to general a color array with N empty units, and proceeds immediately to block 58, where a check is conducted to determine if a request for randomly selecting color has been detected. If NO, the procedure proceeds immediately to block 59. At block 59, the procedure allows a user to select a color for a blank unit of the N-unit blank color array, and proceeds immediately to block 60. At block 60, the procedure allows the data processing system to fill the empty unit with colors selected by a user, and proceeds immediately to block 61, where a check is conducted to determine if there still exists empty unit in the array. If YES, the procedure continues going back to block 59. Returning to block 61, if there exists no empty unit in the array, the procedure proceeds immediately to block 65 (FIG. 6). Returning to block 58, if a request for randomly selecting color is detected, the procedure proceeds immediately to block 62. At block 62, the procedure allows the data processing system to randomly select a color from all available colors, and proceeds immediately to block 63. At block 63, the procedure allows the data processing system to fill the empty unit of the color array, and proceeds immediately to block 64, where a check is conducted to determine if there exists any empty unit in the color array. If YES, the procedure continues going back to block 62. Returning to block 64, if there exists no empty unit in the array, the procedure proceeds immediately to block 65 (FIG. 6). At block 65, a check is conducted to determine if a request for randomly selecting color from the color array is detected. If YES, the procedure proceeds immediately to block 68. At block 68, the procedure randomly selects a color from the color array, and proceeds immediately to block 69. At block 69, the procedure gets an input unit from an inputting device, and proceeds immediately to block 70. At block 70, the procedure displays the input unit as an output unit in the selected color, and proceeds immediately to block 71, where a check is conducted to determine if a request for inputting has been detected. If NO, the procedure proceeds immediately to block 79 and ends right there. Returning to block 71, if a request for inputting is detected, the procedure continues going back to block 68. Returning to block 65, if a request for randomly selecting a color from the color array is not detected, the procedure proceeds immediately to block 66, where a check is conducted to determine if a request for re-arranging the color array by a user has been detected. If YES, the procedure proceeds immediately to block 67. At block 67, the procedure allows a user to re-arrange the color array through an inputting device, such as keyboard, mouse, voice recognition device, and like, and proceeds immediately to block 72. Returning to block 66, if a request for re-arranging the color array is not detected, the procedure proceeds immediately to block 72. At block 72, a check is conducted to determine if the end of the color array has been reached. If YES, the procedure proceeds immediately to block 73. At block 73, the procedure starts the color array from the beginning, and proceeds immediately to block 74. Returning to block 72, if the end of the color array has not been reached, the procedure proceeds immediately to block 74. At block 74, the procedure allows the data processing system to select a color from current unit of the color array, and proceeds immediately to block 75. At block 75, the procedure allows the data processing system to get an input unit from an inputting device, such as keyboard, mouse, voice recognition device, and like, and proceeds immediately to block 76. At block 76, the procedure displays the input unit as an output unit in the selected color on the displayer, and proceeds immediately to block 77. At block 77, the procedure moves down to next unit of color array, and proceeds to block 78, where a check is conducted to determine if a request for inputting input unit has been detected. If YES, the procedure continues going back to block 72. Returning to block 78, if a request for inputting input unit has not been detected, the procedure proceeds to block 79 and ends right there.

Figure 7:
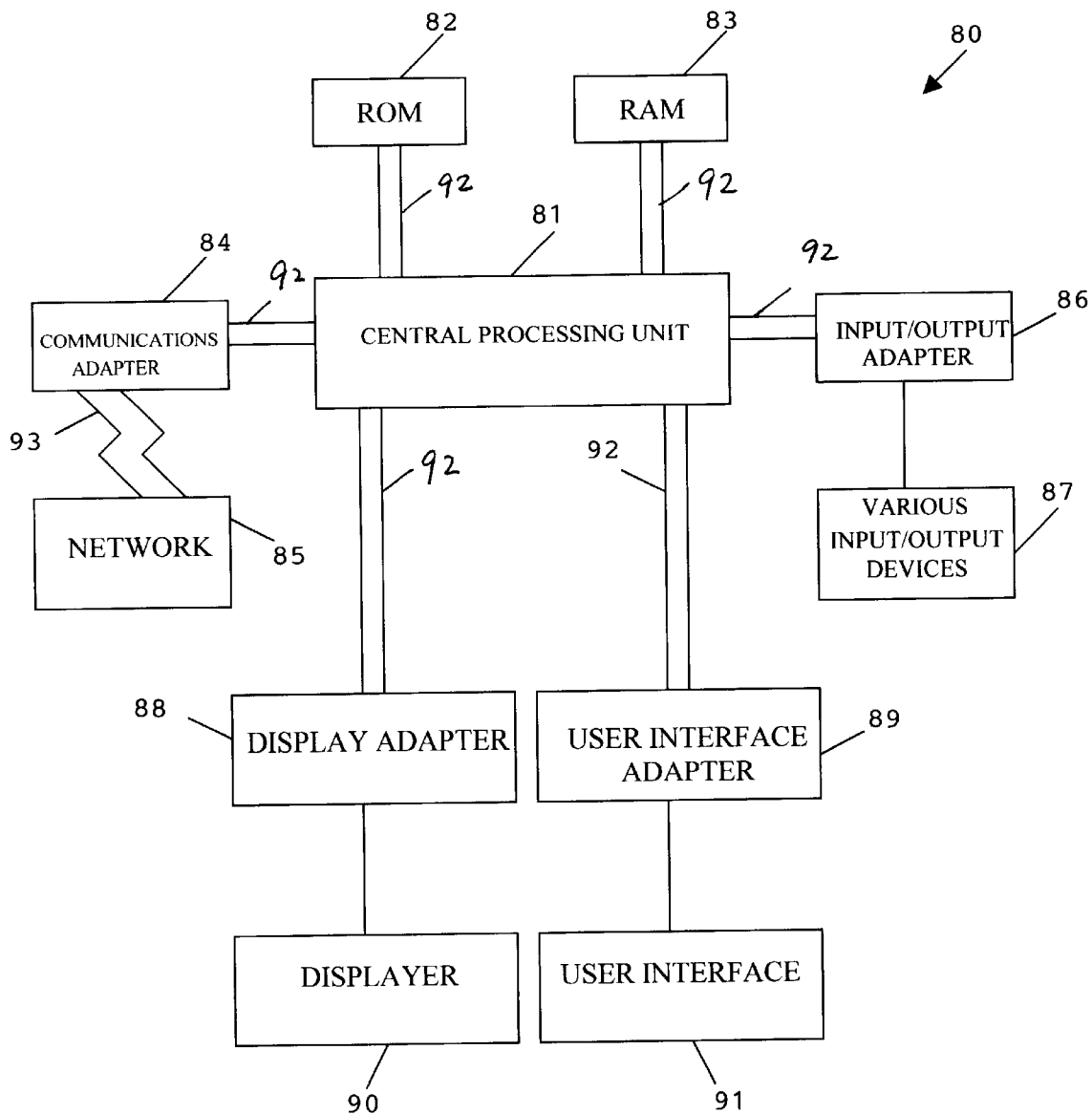
FIG. 7 is a data processing system where the invention may be practiced.

Referring now to FIG. 7, there is shown a data processing system 80 where the invention may be practiced. The data processing system 80 contains a central processing unit (CPU) 81, connected to random access memory (RAM) 82, read only memory (ROM) 83, input/output adapter 86, communications adapter 84, displayer adapter 88, user interface adapter 89, through a bus 92. The CPU 81 is capable of communicating with a plurality of Input/Output devices 87 through Input/Output adapter 86. The Input/Output devices 87 include compact disk, floppy disk devices, hard drives, and like. The CPU 81 is also capable of communicating with a network 85 through Internet connection 93. The CPU 81 is also capable of communicating with a displayer 90 through the displayer adapter 88 to display the execution of the data by the CPU 81 on the displayer 90. The displayer 90 can be a color monitor of the data processing system, a color printer connected to the data processing system, or like. The CPU 81 is also capable of communicating with a user interface 91 through the user interface adapter 89 to take command from a user. The user interface 91 can be a mouse connected to the data processing system 80, a keyboard connected to the data processing system 80, a voice recognition device connected to the data processing system 80, or like.

Figure 8:
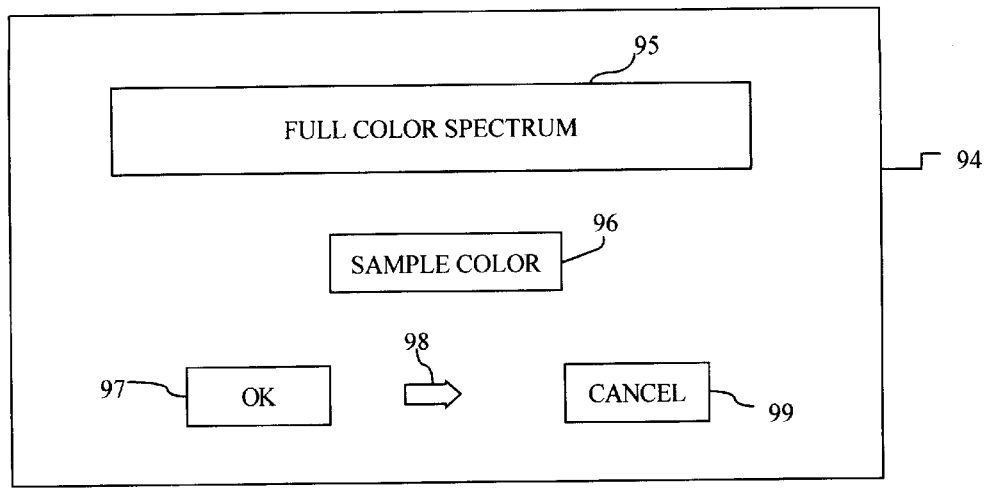
FIG. 8 is a background color selector.

Referring now to FIG. 8, there is shown a background color selector 94. When the procedure proceeds to block 36 (FIG. 3), the background color selector 94 appears on the displayer 90 (FIG. 7). The background selector 94 has a full color spectrum 95 with all the colors available to the data processing system 80, a sample color window 96, an OK button 97, an indicator 98, and a CANCEL button 99. In order to select a background color, a user needs to first active the indicator 98 and then point the indicator 98 to any color on the fill color spectrum 95. At the same time, the selected color appears in the sample color window 96. If a user dose not want the color appears in the sample color window 96, he or she can hit the CANCEL button 99 to cancel the selected color. If a user wants the color appears in the sample color window 96 as the background color, he or she can hit the OK button 97 to confirm the color selection. The background color selector 94 is then closed automatically, and the background color is changed to the selected color.

Figure 9:
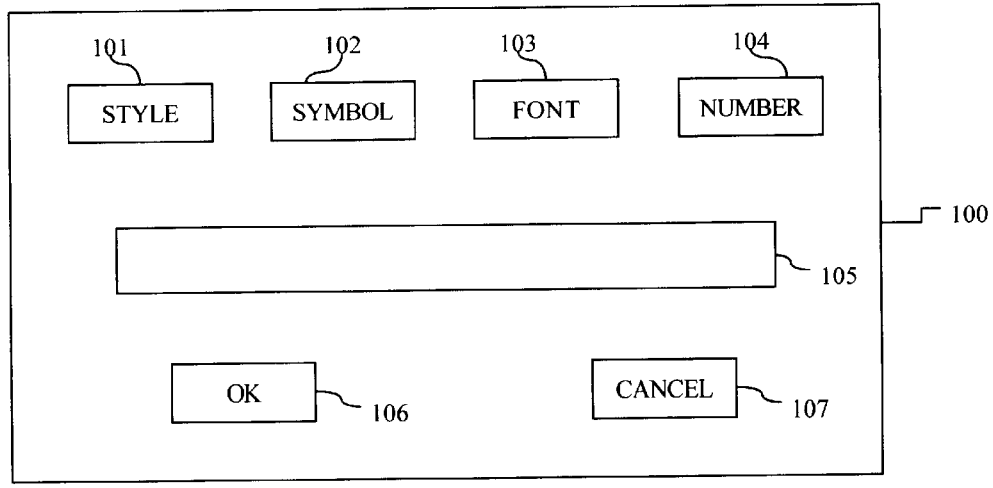
FIG. 9 is an input unit definer.

Referring now to FIG. 9, there is shown an input unit definer 100. When the procedure proceeds to block 40 (FIG. 3), the input unit definer 100 appears on the displayer 90 (FIG. 7). The input unit definer 100 has a STYLE button 101, a SYMBOL button 102, a FONT button 103, a NUMBER button 104, an inputting window 105, an OK button 106, and a CANCEL button 107. A user can define an input unit by typing in whatever he or she wants in the inputting window 105. A user is able to define the style of the character of the input unit by active the STYLE button 101, and the font of the character of the input unit by active the FONT button 103. A user can also add symbols into input unit by active the SYMBOL button 102, and add numbers into input unit by active the NUMBER button 104. The OK button 106 is provided to confirm the inputs in the inputting window 105 as input unit by a user, and close the input unit definer 100. The CANCEL button 107 is provided to clear the inputting window 105.

Figure 10:
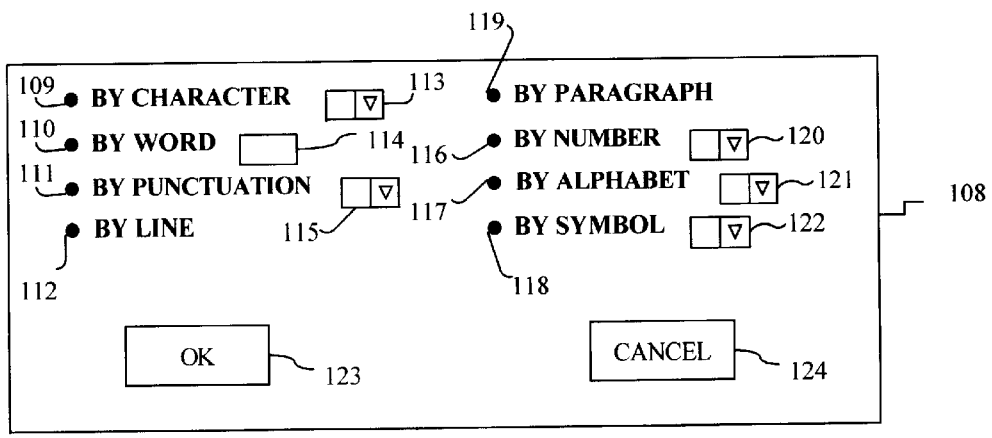
FIG. 10 is a predefined input unit selector.

Referring now to FIG. 10, there is shown a predefined input unit selector 108. The predefined input unit selector 108 includes a BY CHARACTER button 109 with a pull-down menu 113, which has a list of all the characters, a BY WORD button 110 with an inputting window 114, where the word can be typed, a BY PUNCTUATION button 111 with a pull-down menu 115, which has a list of all the punctuations, a BY LINE button 112, a BY NUMBER button 116 with a pull-down menu 120, which has a list of all the numbers, a BY ALPHABET button 117 with a pull-down menu 121, which has a list of all the alphabets, a BY SYMBOL button 118 with a pull-down menu 122, which has a list of all the symbols, a BY PARAGRAPH button 119, an OK button 123, and a CANCEL button 124. A user can make any selection and hit the OK button 123 to confirm the input unit and close the predefined input unit selector 108. A user can hit the CANCEL button 124 to cancel all the selection.

Figure 11:
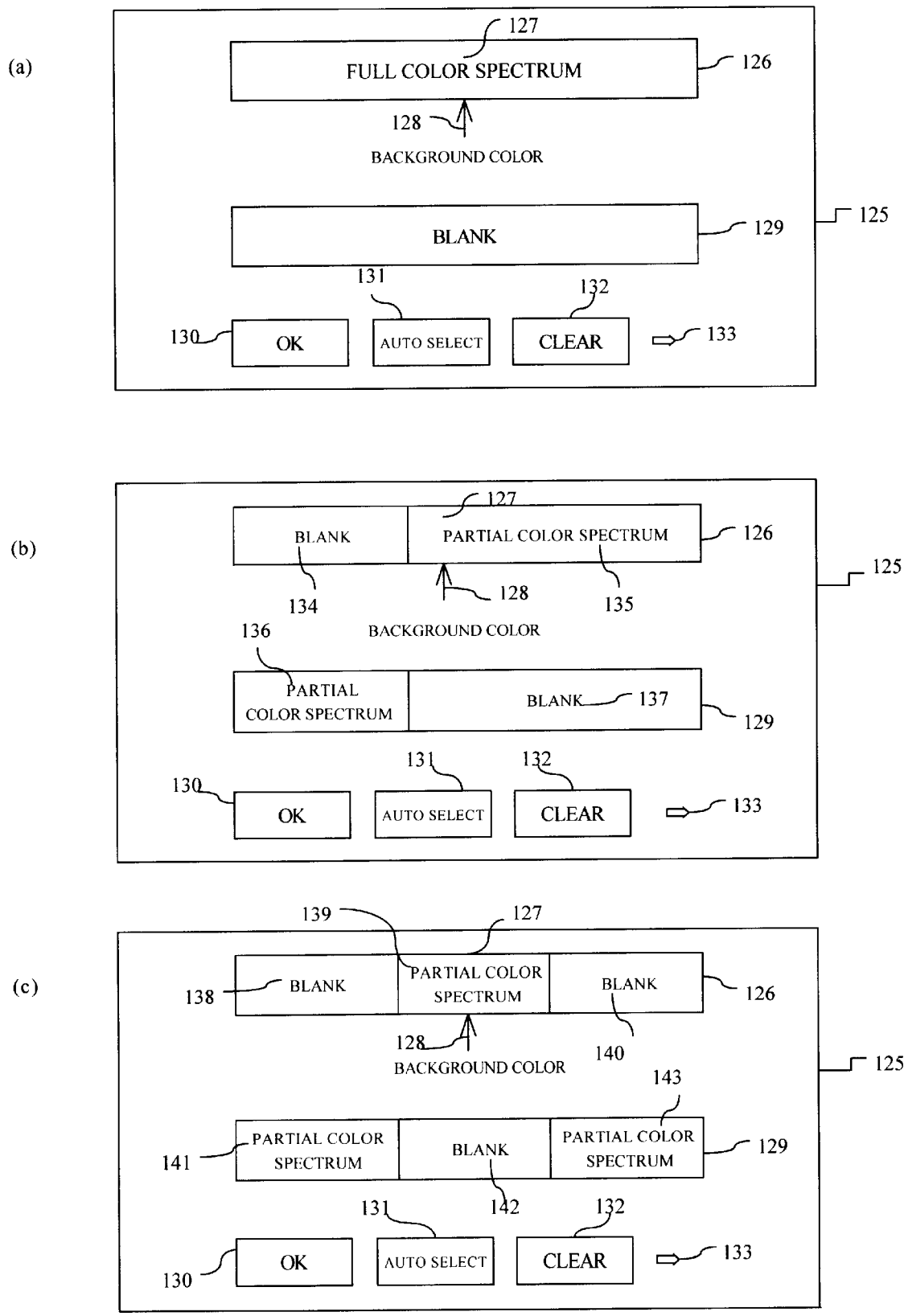
FIG. 11 is an output color spectrum selector.

Referring now to FIG. 11(a), there is shown an output color spectrum selector 125. The output color spectrum selector 125 includes a full color spectrum window 126 with an arrow 128 pointing at the background color 127, which cannot be selected at any time as output color, an inputting window 129, an OK button 130, an AUTO SELECT button 131, a CLEAR button 132, and a pointing button 133. Referring now to FIG. 11(b), a user can active the pointing button 133, and use the pointing button 133 to select a partial color spectrum 136 from the full color spectrum 126. A user can then take the partial color spectrum 136 from the full color spectrum 126, move it down to the inputting window 129 and leave a blank area 134 and a partial color spectrum 135 in the full color spectrum window 126. The inputting window 129 now comprises a partial color spectrum 136 and a blank area 137. Referring now to FIG. 11(c), a user can also active the AUTO SELECT button 131. The data processing system will then automatically select certain predetermined length of partial color spectrum 139 on either side of the background color 127, keep the partial color spectrum 139 in the full color spectrum window 126, move the partial color spectrum 141 and 143 to the inputting window 129, and leave blank area 138 and blank area 140 in the full color spectrum window 126. The inputting window 129 now comprises a partial color spectrum 141, a blank area 142, and another partial color spectrum 143. A user can click the OK button 130 to confirm the selection of the color in the inputting window 129, and close the output color spectrum selector 125. A user can click the CLEAR button 132 to clear the inputting window 129.

Figure 12:
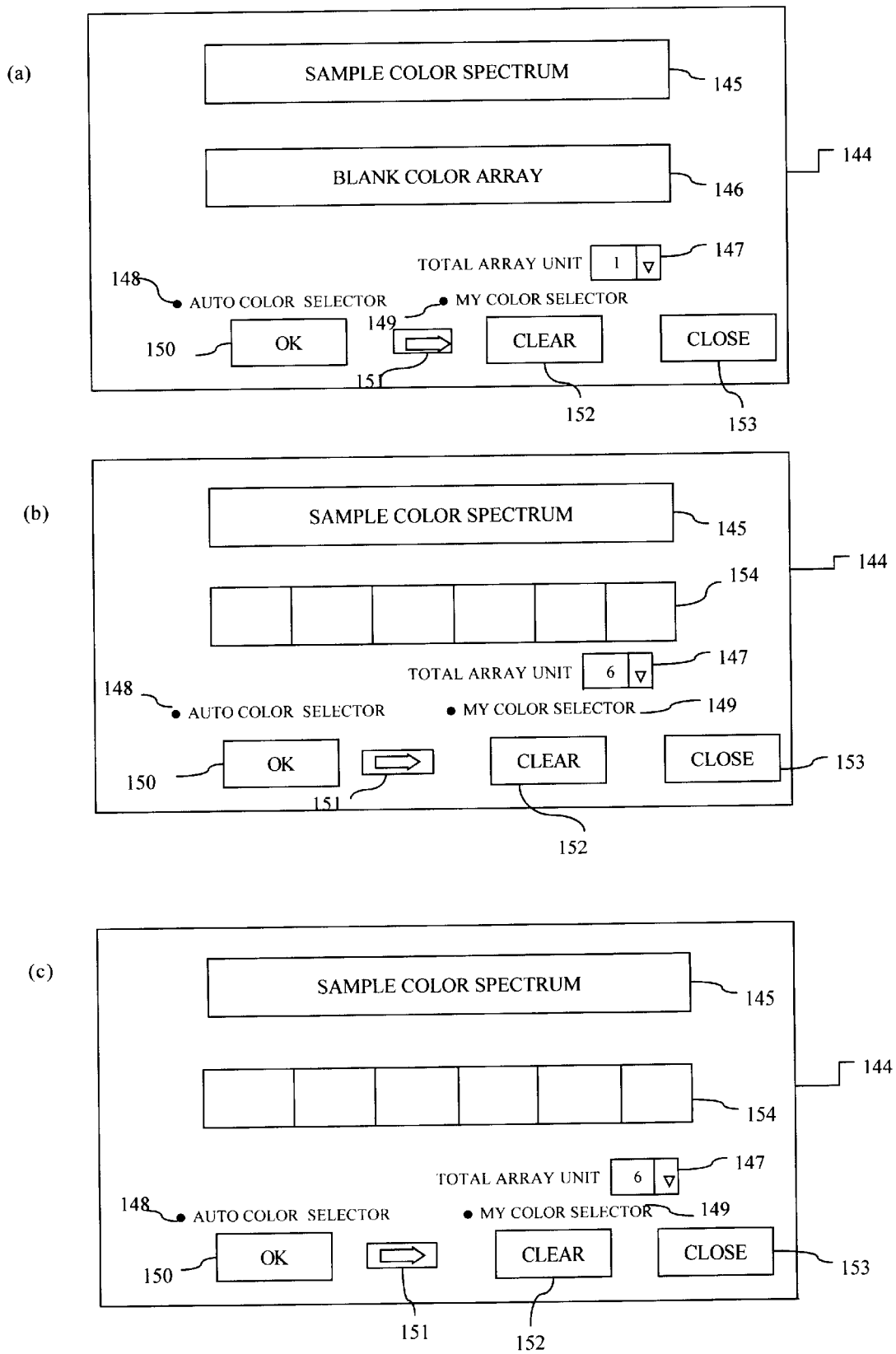
FIG. 12 is an output color selector

Referring now to FIG. 12(a), there is shown an output color selector 144. The output color selector 144 includes a sample color spectrum 145, which has all the colors in the inputting window 129 of the output color spectrum selector 125, a one-unit blank color array 146, a total array unit pull-down menu 147, which has a list of all the numbers, an AUTO COLOR SELECTOR button 148, a MY COLOR SELECTOR button 149, an OK button 150, a pointing button 151, a CLEAR button 152, and a CLOSE button 153. Referring now to FIG. 12(b), for example, a user actives the total array unit pull-down menu 147, and chooses a number 6 in the total array unit pull-down menu 147. The data processing system will immediately divide the one-unit blank color array 146 into a six-unit blank color array 154. A user can active MY COLOR SELECTOR 149, and active the pointing button 151 to select colors from the sample color spectrum 145 to fill the six-unit blank color array 154. Referring to FIG. 12(c), for example, a user actives the AUTO COLOR SELECTOR button 148 to let the data processing system to fill randomly selected colors from the sample color spectrum 145 into the six-unit blank color array 154. The color spectrum in the preferred embodiment can be a color library of any kind.

Hence, the present invention provides a method, an apparatus, and a computer program product that is capable of displaying rotating color output units, such as a chain of rotating color output units, on a displayer of a data processing system.

The present invention also provides a method, an apparatus, and a computer program product that is capable of displaying rotating color output units, such as a chain of rotating color output units, on a displayer of a data processing system in an efficient way.

The present invention also provides a method, an apparatus, and a computer program product that is capable of displaying rotating color output units, such as a chain of rotating color output units, in randomly selected colors from all available colors on a displayer of a data processing system in an efficient way.

The present invention also provides a method, an apparatus, and a computer program product that is capable of displaying rotating color output units, such as a chain of rotating color output units, in randomly selected colors from a pre-determined color sequence on a displayer of a data processing system in an efficient way.

The present invention also provides a method, an apparatus, and a computer program product that is capable of displaying rotating color output units, such as a chain of rotating color output units, in sequentially selected colors from a pre-determined color sequence on a displayer of a data processing system in an efficient way.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

I claim:

1. A method for displaying a chain of input units as a chain of rotating color output units in different colors according to a color sequence on a displayer of a data processing system, said method comprising:

generating a request to start a process for displaying said chain of input units as said chain of rotating color output units in different colors according to said color sequence on said displayer;

selecting a background color for said displayer;

creating a color sequence;

making said background color unavailable to said color sequence;

getting an input unit from an inputting device;

getting a color from said color sequence; and displaying said input unit as an output unit in said color on said displayer of said data processing system.

2. The method of claim 1 further comprising repeating the step of getting an input unit from an inputting device, the step of getting a color from said color sequence, and the step of displaying said input unit as an output unit in said color on said displayer of said data processing system for each input unit until all the input units have been inputted and displayed as a chain of rotating color output units in different colors according to said color sequence on said displayer of said data processing system.

3. An apparatus for displaying a chain of input units as a chain of rotating color output units in different colors according to a color sequence on a displayer of a data processing system, said apparatus comprising:

means for generating a request to start a process for displaying said chain of input units as said chain of rotating color output units in different colors according to said color sequence on said displayer;

means for selecting a background color for said displayer;

means for creating a color sequence;

means for making said background color unavailable to said color sequence;

means for getting an input unit from an inputting device;

means for getting a color from said color sequence; and means for displaying said input unit as an output unit in said color on said displayer of said data processing system.

4. The apparatus of claim 3 further comprising means for repeating the step of getting an input unit from an inputting device, the step of getting a color from said color sequence, and the step of displaying said input unit as an output unit in said color on said displayer of said data processing system for each input unit until all the input units have been inputted and displayed as a chain of rotating color output units in different colors according to said color sequence on said displayer of said data processing system.

5. A computer program product having a computer readable medium having computer program logic recorded thereon for a method for displaying a chain of input units as a chain of rotating color output units in different colors according to a color sequence on a displayer of a data processing system, said computer program product comprising:

computer readable means for generating a request to start a process for displaying said chain of input units as said chain of rotating color output units in different colors according to said color sequence on said displayer;

computer readable means for selecting a background color for said displayer;

computer readable means for creating a color sequence;

computer readable means for making said background color unavailable to said color sequence;

computer readable means for getting an input unit from an inputting device;

computer readable means for getting a color from said color sequence; and computer readable means for displaying said input unit as an output unit in said color on said displayer of said data processing system.

6. The computer program product of claim 5 further comprising computer readable means for repeating the step of getting an input unit from an inputting device, the step of getting a color from said color sequence, and the step of displaying said input unit as an output unit in said color on said displayer of said data processing system for each input unit until all the input units have been inputted and displayed as a chain of rotating color output units in different colors according to said color sequence on said displayer of said data processing system.

7. A method for displaying a chain of input units as a chain of rotating color output units according to a color sequence on a displayer of a data processing system, said method comprising:

generating a request to start a process for displaying said chain of input units as said chain of rotating color output units in different colors according to said color sequence on said displayer;

selecting a background color for said displayer;

creating a color sequence;

making said background color unavailable to said color sequence;

getting a chain of input units; and displaying said chain of input units as said chain of rotating color output units in different colors according to said color sequence on said displayer of said data processing system.

8. The method of claim 7, wherein the step of getting a chain of input units can be either a step of getting a chain of input units, which is already on said displayer, or a step of getting a chain of input units, which is not yet on said displayer.

9. The method of claim 8, wherein the step of getting a chain of input units, which is not yet on said displayer, can be either a chain of input units recorded on a computer readable medium or a chain of input units directly from an inputting device.

10. An apparatus for displaying a chain of input units as a chain of rotating color output units according to a color sequence on a displayer of a data processing system, said apparatus comprising:

means for generating a request to start a process for displaying said chain of input units as said chain of rotating color output units in different colors according to said color sequence on said displayer;

means for selecting a background color for said displayer;

means for creating a color sequence;

means for making said background color unavailable to said color sequence;

means for getting a chain of input units; and means for displaying said chain of input units as said chain of rotating color output units in different colors according to said color sequence on said displayer of said data processing system.

11. The apparatus of claim 10, wherein the means for getting a chain of input units can be either a means for getting a chain of input units, which is already on said displayer, or a means for getting a chain of input units, which is not yet on said displayer.

12. The apparatus of claim 11, wherein the means for getting a chain of input units, which is not yet on said displayer, can be either a means for getting a chain of input units recorded on a computer readable medium or a means for getting a chain of input units directly from an inputting device.

13. A computer program product having a computer readable medium having computer program logic recorded thereon for a method for displaying a chain of input units as a chain of rotating color output units according to a color sequence on a displayer of a data processing system, said computer program product comprising:

computer readable means for generating a request to start a process for displaying said chain of input units as said chain of rotating color output units in different colors according to said color sequence on said displayer;

computer readable means for selecting a background color for said displayer;

computer readable means for creating a color sequence;

computer readable means for making said background color unavailable to said color sequence;

computer readable means for getting a chain of input units; and computer readable means for displaying said chain of input units as said chain of rotating color output units in different colors according to said color sequence on said displayer of said data processing system.

14. The computer program product of claim 13, wherein the computer readable means for getting a chain of input units can be either a computer readable means for getting a chain of input units, which is already on said displayer, or a computer readable means for getting a chain of input units, which is not yet on said displayer.

15. The computer program product of claim 14, wherein the computer readable means for getting a chain of input units, which is not yet on said displayer, can be either a computer readable means for getting a chain of input units recorded on a computer readable medium or a computer readable means for getting a chain of input units directly from an inputting device.

16. A method for displaying a chain of input units as a chain of rotating color output units in different colors according to a color sequence on a displayer of a data processing system, said method comprising:

generating a request by a user through an inputting device connecting to said data processing system to start a process for displaying said chain of input units as said chain of rotating color output units in different colors inputted by said user into said data processing system on said displayer;

selecting a background color by said user through said inputting device for said displayer;

defining an input unit;

presenting a color sequence selector on said displayer having a color library;

taking out said background color automatically from said color library;

selecting required colors;

presenting a one-unit blank array;

selecting a number N to define number of units of said blank array;

dividing said one-unit blank array into an N-unit blank array automatically;

filling colors into all units of said N-unit blank array to create an N-unit color array;

terminating said color sequence selector:

generating a request by said user through said inputting device to start an inputting process;

getting an input unit from an inputting device;

getting a color from said color sequence by said user through said inputting device; and displaying said input unit as an output unit in said color on said displayer of said data processing system.

17. The method of claim 16 wherein the step of selecting a background color for said displayer further comprises:

presenting a background color selector on said displayer having a color library said color library having various existing colors and capable of being added for more colors through said inputting device by said user;

defining a color on said background color selector by said user, said color being either one existing color in said color library or one non-existing color capable of being created by said user through said inputting device;

updating background color to said color immediately; and terminating said background color selector.

18. The method of claim 16 wherein the step of defining an input unit further comprises:

presenting an input unit definer with a variety of choices of predefined input units and user-defined input units, said user-defined input units being inputted by said user through said inputting device connected to said data processing system;

identifying an input unit by said user through said inputting device connected to said data processing system; and terminating said input unit definer according to a pre-defined symbol, said pre-defined symbol being defined by said user through said inputting device connected to said data processing system.

19. An apparatus for displaying a chain of input units as a chain of rotating color output units in different colors according to a color sequence on a displayer of a data processing system, said apparatus comprising:

means for generating a request by a user through an inputting device connecting to said data processing system to start a process for displaying said chain of input units as said chain of rotating color output units in different colors inputted by said user into said data processing system on said displayer;

means for selecting a background color by said user through said inputting device for said displayer;

means for defining an input unit;

means for presenting a color sequence selector on said displayer having a color library;

means for taking out said background color automatically from said color library;

means for selecting required colors;

means for presenting a one-unit blank array;

means for selecting a number N to define number of units of said blank array;

means for dividing said one-unit blank array into an N-unit blank array automatically;

means for filling colors into all units of said N-unit blank array to create an N-unit color array;

means for terminating said color sequence selector;

means for generating a request by said user through said inputting device to start an inputting process;

means for getting an input unit from an inputting device;

means for getting a color from said color sequence by said user through said inputting device; and means for displaying said input as an output unit in said color on said displayer of said data processing system.

20. The apparatus of claim 19 wherein the means for selecting a background color for said displayer further comprises:

means for presenting a background color selector on said displayer having a color library, said color library having various existing colors and capable of being added for more colors through said inputting device by said user;

means for defining a color on said background color selector by said user, said color being either one existing color in said color library or one non-existing color capable of being created by said user through said inputting device;

means for updating background color to said color immediately; and means for terminating said background color selector.

21. The apparatus of claim 19 wherein the means for defining an input unit further comprises:

means for presenting an input unit definer with a variety of choices of predefined input units and user-defined input units, said user-defined input units being inputted by said user through said inputting device connected to said data processing system;

means for identifying an input unit by said user through said inputting device connected to said data processing system; and means for terminating said input unit definer according to a pre-defined symbol, said pre-defined symbol being defined by said user through said inputting device connected to said data processing system.

22. A computer program product having a computer readable medium having computer program logic recorded thereon for a method for displaying a chain of input units as a chain of rotating color output units in different colors according to a color sequence on a displayer of a data processing system, said computer program product comprising:

computer readable means for generating a request by a user through an inputting device connecting to said data processing system to start a process for displaying said chain of input units as said chain of rotating color output units in different colors inputted by said user into said data processing system on said displayer;

computer readable means for selecting a background color by said user through said inputting device for said displayer;

computer readable means for defining an input unit;

computer readable means for presenting a color sequence selector on said displayer having a color library;

computer readable means for taking out said background color automatically from said color library;

computer readable means for selecting required colors;

computer readable means for presenting a one-unit blank array;

computer readable means for selecting a number N to define number of units of said blank array;

computer readable means for dividing said one-unit blank array into an N-unit blank array automatically;

computer readable means for filling colors into all units of said N-unit blank array to create an N-unit color array;

computer readable means for terminating said color sequence selector;

computer readable means for generating a request by said user through said inputting device to start an inputting process;

computer readable means for getting an input unit from an inputting device;

computer readable means for getting a color from said color sequence by said user through said inputting device; and computer readable means for displaying said input unit as an output unit in said color on said displayer of said data processing system.

23. The computer program product of claim 22 wherein the computer readable means for selecting a background color for said displayer further comprises:

computer readable means for presenting a background color selector on said displayer having a color library, said color library having various existing colors and capable of being added for more colors through said inputting device by said user;

computer readable means for defining a color on said background color selector by said user, said color being either one existing color in said color library or one non-existing color capable of being created by said user through said inputting device;

computer readable means for updating background color to said color immediately; and computer readable means for terminating said background color selector.

24. The computer program product of claim 22 wherein the computer readable means for selecting a background color for said displayer further comprises:

computer readable means for presenting an input unit definer with a variety of choices of predefined input units and user-defined input units, said user-defined input units being inputted by said user through said inputting device connected to said data processing system;

computer readable means for identifying an input unit by said user through said inputting device connected to said data processing system; and computer readable means for terminating said input unit definer according to a pre-defined symbol, said pre-defined symbol being defined by said user through said inputting device connected to said data processing system.

25. A method for displaying a chain of rotating color words in different colors according to a rotating color sequence on a displayer of a data processing system, the method comprising the step of:

generating a request to start a process for displaying said chain of rotating color words in different colors according to said rotating color sequence on said displayer;

selecting a background color for said displayer;

creating said rotating color sequence, the step of creating said rotating color sequence further comprising the steps of:

presenting a color sequence selector on said displayer having a color library;

taking out said background color automatically from said color library;

selecting required colors;

presenting a one-unit blank array;

selecting a number N to define number of units of said blank array;

dividing said one-unit blank array into an N-unit blank array automatically;

filling colors into all units of said N-unit blank array to create an N-unit color array;

terminating said color sequence selector;

generating a request to start an inputting process;

getting a word from an inputting device;

getting a color from said rotating color sequence; and displaying said word in said color on said displayer of said data processing system.

26. An apparatus for displaying a chain of rotating color words in different colors according to a rotating color sequence on a displayer of a data processing system, the apparatus comprising:

means for generating a request to start a process for displaying said chain of rotating color words in different colors according to said rotating color sequence on said displayer;

means for selecting a background color for said displayer;

means for creating said rotating color sequence, the means for creating said rotating color sequence further comprising:

means for presenting a color sequence selector on said displayer having a color library;

means for taking out said background color automatically from said color library;

means for selecting required colors;

means for presenting a one-unit blank array;

means for selecting a number N to define number of units of said blank array;

means for dividing said one-unit blank array into an N-unit blank array automatically;

means for filling colors into all units of said N-unit blank array to create an N-unit color array;

means for terminating said color sequence selector;

means for generating a request to start an inputting process;

means for getting a word from an inputting device;

means for getting a color from said rotating color sequence; and means for displaying said word in said color on said displayer of said data processing system.

27. A computer program product having a computer readable medium having computer program logic recorded thereon for a method for displaying a chain of rotating color words in different colors according to a rotating color sequence on a displayer of a data processing system, the computer program product comprising:

computer readable means for generating a request to start a process for displaying said chain of rotating color words in different colors according to said rotating color sequence on said displayer;

computer readable means for selecting a background color for said displayer;

computer readable means for creating said rotating color sequence, the computer readable means for creating said rotating color sequence further comprising:

computer readable means for presenting a color sequence selector on said displayer having a color library;

computer readable means for taking out said background color automatically from said color library;

computer readable means for selecting required colors;

computer readable means for presenting a one-unit blank array;

computer readable means for selecting a number N to define number of units of said blank array;

computer readable means for dividing said one-unit blank array into an N-unit blank array automatically;

computer readable means for filling colors into all units of said N-unit blank array to create an N-unit color array;

computer readable means for terminating said color sequence selector;

computer readable means for generating a request to start an inputting process;

computer readable means for getting a word from an inputting device;

computer readable means for getting a color from said rotating color sequence; and computer readable means for displaying said word in said color on said displayer of said data processing system.

* * * * *